(12) United States Patent
Amini et al.

(10) Patent No.: US 10,964,302 B2
(45) Date of Patent: Mar. 30, 2021

(54) VIBRATION DAMPING MATERIAL FOR HIGH TEMPERATURE USE

(71) Applicant: United Technologies Corporation, Hartford, CT (US)

(72) Inventors: Shahram Amini, Glastonbury, CT (US); Christopher W. Strock, Kennebunk, ME (US); Sergei F. Burlatsky, West Hartford, CT (US); Dmitri Novikov, Avon, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 680 days.

(21) Appl. No.: 14/591,137

(22) Filed: Jan. 7, 2015

(65) Prior Publication Data

US 2015/0199952 A1      Jul. 16, 2015

Related U.S. Application Data

(60) Provisional application No. 61/926,993, filed on Jan. 14, 2014.

(51) Int. Cl.

| | |
|---|---|
| *G10K 11/165* | (2006.01) |
| *C04B 35/56* | (2006.01) |
| *C04B 35/58* | (2006.01) |
| *C22C 1/05* | (2006.01) |
| *C22C 1/10* | (2006.01) |
| *C22C 29/06* | (2006.01) |
| *C22C 29/16* | (2006.01) |
| *C22C 32/00* | (2006.01) |

(52) U.S. Cl.
CPC ............ *G10K 11/165* (2013.01); *C04B 35/56* (2013.01); *C04B 35/5615* (2013.01); *C04B 35/5618* (2013.01); *C04B 35/58* (2013.01); *C22C 1/051* (2013.01); *C22C 1/1036* (2013.01); *C22C 1/1084* (2013.01); *C22C 29/06* (2013.01); *C22C 29/067* (2013.01); *C22C 29/16* (2013.01); *C22C 32/0052* (2013.01); *C22C 32/0068* (2013.01); *B22F 2998/10* (2013.01)

(58) Field of Classification Search
None
See application file for complete search history.

(56) References Cited

U.S. PATENT DOCUMENTS

| | | | |
|---|---|---|---|
| 5,262,232 | A | 11/1993 | Wilfong et al. |
| 5,763,107 | A | 6/1998 | Rickerby et al. |
| 5,820,348 | A | 10/1998 | Fricke |
| (Continued) | | | |

FOREIGN PATENT DOCUMENTS

| | | |
|---|---|---|
| WO | 2010033278 | 3/2010 |
| WO | 2012177712 | 12/2012 |
| WO | 2014143266 | 9/2014 |

OTHER PUBLICATIONS

Liang, Y. et al. "Electrodeposition and characterization of Ni/Ti3Si(Al)C2 composite coatings." 2011. J. Materials Science Technology. 27(11). 1016-1024.*

(Continued)

*Primary Examiner* — Nicholas A Wang
(74) *Attorney, Agent, or Firm* — Carlson, Gaskey & Olds, P.C.

(57) ABSTRACT

An article includes a MAX phase solid and a high temperature melting point metallic material interdispersed with the MAX phase material.

11 Claims, 1 Drawing Sheet

(56) References Cited

U.S. PATENT DOCUMENTS

| | | |
|---|---|---|
| 2004/0250334 A1 | 12/2004 | El-Raghy et al. |
| 2006/0057618 A1 | 3/2006 | Piper et al. |
| 2008/0131686 A1* | 6/2008 | Strock .................. C23C 4/02 |
| | | 428/332 |
| 2009/0041609 A1 | 2/2009 | Duz et al. |
| 2010/0055492 A1* | 3/2010 | Barsoum ............... B22D 19/02 |
| | | 428/613 |
| 2011/0104464 A1* | 5/2011 | Pyzik .................. C04B 35/5615 |
| | | 428/218 |
| 2013/0253143 A1 | 9/2013 | Takeda et al. |

OTHER PUBLICATIONS

Sun, Z.M. et al. "Microstructure and mechanical properties of porous Ti3SiC2." 2005. Acta Materiallia. 53. p. 4359-4366. (Year: 2005).*

European Search Report for European Patent Application No. 15150793 completed Mar. 13, 2015.

MAX phases: Bridging the gap between metals and ceramics. American Ceramic Society Bulletin, vol. 92(3). Apr. 2013.

Li, S., Xiao, L., Song, G., Wu, X., Sloof, W., and van der Zwaag, S. (2013). Oxidation and crack healing behavior of a find-grained Cr2AlC ceramic. Journal of the American Ceramic Society, vol. 96(3). p. 892-899.

MAX Phase and AAC Research Groups. http://max.materials.drexel.edu/research-areas/max-phases retrieved Nov. 20, 2013.

* cited by examiner

VIBRATION DAMPING MATERIAL FOR HIGH TEMPERATURE USE

CROSS-REFERENCE TO RELATED APPLICATION

This application claims priority to U.S. Provisional Application No. 61/926,993, filed Jan. 14, 2014.

BACKGROUND

This disclosure relates to composite materials.

Various types of machinery can include rotating and fixed components that may be subjected to mechanical vibrations during use. Polymeric materials can be used for vibrational or acoustic energy attenuation at relatively low temperatures. However, at higher temperatures, polymeric materials cannot survive environmental and/or mechanical demands and thus are not viable options.

SUMMARY

An article according to an example of the present disclosure includes a MAX phase solid having a formula $M_{n+1}AX_n$ where n=1-3, M is an early transition metal, A is an A-group element and X includes at least one of carbon and nitrogen and a high temperature melting point metallic material interdispersed with the MAX phase solid.

In a further embodiment of any of the foregoing embodiments, the high temperature melting point metallic material is a metal or an alloy having a base metal selected from the group consisting of Ti, Zr, Y, Sc, Be, Co, Fe, Ni, and combinations thereof.

In a further embodiment of any of the foregoing embodiments, the high temperature melting point metallic material has a hexagonal close-packed (hcp) crystalline structure.

In a further embodiment of any of the foregoing embodiments, the high temperature melting point metallic material is Ni or a Ni-based alloy.

In a further embodiment of any of the foregoing embodiments, the high temperature melting point metallic material is Co or a Co-based alloy.

In a further embodiment of any of the foregoing embodiments, the high temperature melting point metallic material is Fe or an Fe-based alloy.

In a further embodiment of any of the foregoing embodiments, the high temperature melting point metallic material is Ti or a Ti-based alloy.

In a further embodiment of any of the foregoing embodiments, the MAX phase solid is selected from the group consisting of $Ti_3SiC_2$, $Ti_2AlC$, and combinations thereof.

In a further embodiment of any of the foregoing embodiments, the MAX phase solid includes $Ti_2AlC$.

In a further embodiment of any of the foregoing embodiments, the MAX phase solid includes $Ti_3SiC_2$.

In a further embodiment of any of the foregoing embodiments, the M in the formula $M_{n+1}AX_n$ is selected from the group consisting of Sc, Ti, Zr, Hf, V, Nb, Ta, Cr, Mo, and combinations thereof, and the A in the formula $M_{n+1}AX_n$ is selected from the group consisting of Cd, Al, Gd, In, Tl, Si, Ge, Sn, Pb, P, As, S, and combinations thereof.

In a further embodiment of any of the foregoing embodiments, a ratio, in volume percent, of the high temperature melting point metallic material to the MAX phase solid is from 30:70 to 95:5.

In a further embodiment of any of the foregoing embodiments, a ratio, in volume percent, of the high temperature melting point metallic material to the MAX phase solid is from 30:70 to 70:30.

In a further embodiment of any of the foregoing embodiments, the high temperature melting point metallic material and the MAX phase solid define a porosity of 0 to 50 vol %.

A composite material according to an example of the present disclosure includes a MAX phase solid having a formula $M_{n+1}AX_n$, where n=1-3, M is an early transition metal, A is an A-group element, and X includes at least one of carbon and nitrogen, and a high temperature melting point metallic material interdispersed with the MAX phase solid.

In a further embodiment of any of the foregoing embodiments, the high temperature melting point metallic material is a metal or an alloy having a base metal selected from the group consisting of Ti, Zr, Y, Sc, Be, Co, Fe, Ni, and combinations thereof.

In a further embodiment of any of the foregoing embodiments, a ratio, in volume percent, of the high temperature melting point metallic material to the MAX phase solid is from 30:70 to 95:5.

In a further embodiment of any of the foregoing embodiments, a ratio, in volume percent, of the high temperature melting point metallic material to the MAX phase solid is from 30:70 to 70:30.

In a further embodiment of any of the foregoing embodiments, the high temperature melting point metallic material and the MAX phase solid define a porosity of 0 to 50 vol %.

A method according to an example of the present disclosure includes identifying a vibration characteristic of an articl and controlling a composition of a composite material of the article with respect to the vibration characteristic. The composition includes a MAX phase solid having a formula $M_{n+1}AX_n$, where n=1-3, M is an early transition metal, A is an A-group element, and X includes at least one of carbon and nitrogen, and a high temperature melting point metallic material interdispersed with the MAX phase solid.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Polymeric materials can be used for vibrational or acoustic energy attenuation at relatively low temperatures. Damping in high temperature environments, however, can be challenging because materials that are effective for damping at lower temperatures cannot survive the environmental and/or mechanical demands at the higher temperatures. Therefore, a paradigm that serves lower temperatures regimes cannot serve higher temperature regimes because factors such as corrosion resistance, oxidation resistance, creep resistance, fatigue resistance, and strength at the high temperatures, as well as damping characteristics, can come into play. Disclosed herein is a composite material that is adapted for damping in high temperature environments.

Figure 1:
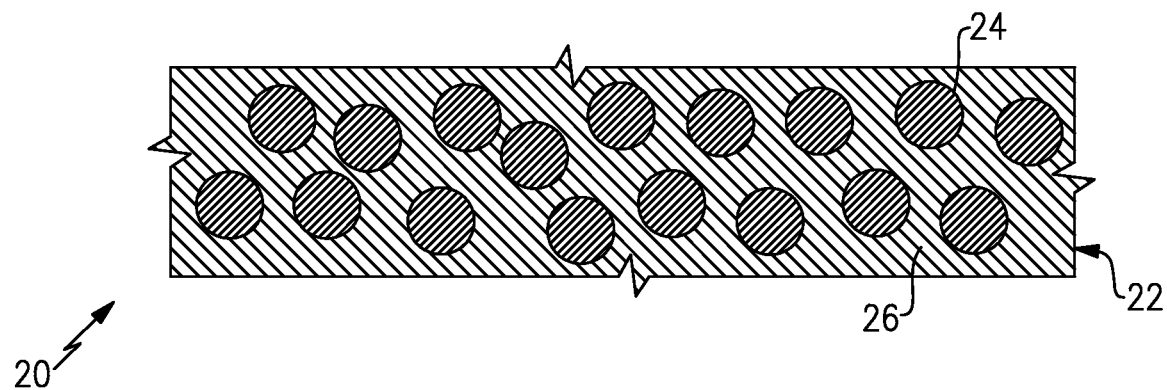
FIG. 1 schematically illustrates an example article having a composite material that includes a MAX phase material and a high temperature melting point metallic material.

FIG. 1 schematically illustrates a representative portion of an article 20 that includes a composite material 22 that can be used for vibrational energy attenuation in high temperature environments. The article 20 can be a gas turbine engine component that includes the composite material 22, but is not limited to such articles. The article 20 may be used in continuous use environments of 1000° F.-2200° F. In gas turbine engines, components in the high pressure compressor section, components in the turbine section, components in the combustor and components in other areas of the engine can operate at such temperatures. These components can be fabricated from, or can include portions that are fabricated from, the composite material 22. As examples, the composite material 22 can be fabricated to form a structural portion of a component, or a non-structural portion of a component, such as a coating.

The composite material 22 includes a MAX phase solid 24 and a high temperature melting point metallic material 26 (hereafter "metallic material 26") interdispersed with the MAX phase solid 24. The MAX phase solid 24 has a formula $M_{n+1}AX_n$, where n=1-3, M is an early transition metal, A is an A-group element of the Periodic Table, and X includes at least one of carbon and nitrogen or both. In further examples, the M in the formula can be selected from Sc, Ti, Zr, Hf, V, Nb, Ta, Cr, Mo, and combinations thereof, and the A in the formula can be selected from Cd, Al, Gd, In, Tl, Si, Ge, Sn, Pb, P, As, S, and combinations thereof.

The MAX phase solid 24 has good thermal stability and oxidation resistance, but mainly serves in the composite material 22 to provide vibrational energy attenuation. The MAX phase solid 24 can exhibit ultrahigh, fully reversible non-linear elastic hysteresis behavior during cyclic elastic deformation that contributes to the high damping characteristics. The metallic material 26 serves to enhace the mechanical strength, ductility and toughness and protect the MAX phase solid 24 at the high temperatures and can be selected to extend the thermal and oxidation resistance of the MAX phase solid 24, as well as to provide corrosion resistance, creep resistance, fatigue resistance, and strength at the high temperatures. Thus, the composite material 22 is adapted for high temperature vibration energy attenuation because of the good damping characteristics of the MAX phase solid 24 at high temperatures, and the good thermal resistance and other high temperature properties of the metallic material 26. extends the temperature range of the MAX phase solid 24 to even higher temperatures. The MAX phase solid 24 and the metallic material 26 can therefore provide a synergistic effect.

In further examples, the MAX phase solid 24 can be selected from:

$Ti_2CdC$, $Sc_2InC$, $Ti_2AlC$, $Ti_2GaC$, $Ti_2InC$, $Ti_2TlC$, $V_2AlC$, $V_2GaC$, $Cr_2GaC$, $Ti_2AlN$, $Ti_2GaN$, $Ti_2InN$, $V_2GaN$, $Cr_2GaN$, $Ti_2GeC$, $Ti_2SnC$, $Ti_2PbC$, $V_2GeC$, $Cr_2Alc$, $Cr_2GeC$, $V_2PC$, $V_2AsC$, $Ti_2SC$, $Zr_2InC$, $Zr_2TlC$, $Nb_2AlC$, $Nb_2GaC$, $Nb_2InC$, $Mo_2GaC$, $Zr_2InN$, $Zr_2TlN$, $Hf_2InC$, $Hf_2TlC$, $Ta_2AlC$, $Ta_2GaC$, $Ti_2GeC$, $Ti_2SnC$, $Ti_2PbC$, $V_2GeC$, $Cr_2AlC$, $Cr_2GeC$, $Zr_2SnC$, $Zr_2PbC$, $Nb_2SnC$, $Hf_2SnC$, $Hf_2PbC$, $Hf_2SnN$, $V_2PC$, $V_2AsC$, $Nb_2PC$, $Nb_2AsC$, $Ti_2SC$ $Zr_2SC$, $Nb_2SC$, $Hf_2SC$, $Ti_3AlC_2$, $V_3AlC_2$, $Ta_3AlC_2$, $Ti_3SiC_2$, $Ti_3GeC_2$, $Ti_3SnC_2$, $Ti_4AlN_3$, $V_4AlC_3$, $Ti_4GaC_3$, $Nb_4AlC_3$, $Ta_4AlC_3$, $Ti_4SiC_3$, $Ti_4GeC_3$, and combinations thereof, but is not limited to these MAX phase solids.

In further examples of any of the aforementioned examples, the metallic material 26 can be a metal or an alloy having a base metal selected from Ti, Zr, Y, Sc, Be, Co, Fe, Ni, and combinations thereof. In a further example, the metallic material 26 is MCrAlY, which can also include MCrAlYX, where X includes an additional alloying element or elements. The M in MCrAlY includes at least one of Ni, Co, and Fe. In some examples the MAX phase solid 24 can diffusion bond with the metallic material 26.

In further examples, for enhanced damping, the selected metallic material 26 has a hexagonal close-packed (HCP) crystalline structure, which can increase damping in comparison to body centered cubic structures. In further examples, the selected metallic material has a face centered cubic atomic crystalline structure and the MAX phase solid 24 is selected from $Ti_3SiC_2$, $Ti_2AlC$, and combinations thereof. For example $Ti_3SiC_2$ and $Ti_2AlC$ can be resistant to oxidation at temperatures up to at least 2400° F.

The relative volumetric contents of the MAX phase solid 24 and the metallic material 26 can be selected to control the properties of the composite material 22 with regard to damping and other requirements. For example, a relatively lower content of the metallic material 26 and a relatively higher content of the MAX phase solid 24 can be used to enhance or accentuate vibrational damping. A relatively higher content of the metallic material 26 and a relatively lower amount of the MAX phase solid 24 can be used to enhance or accentuate strength, corrosion resistance, creep resistance, fatigue resistance, thermal resistance, and/or oxidation resistance at the high use temperatures of the composite material 22.

Figure 2:
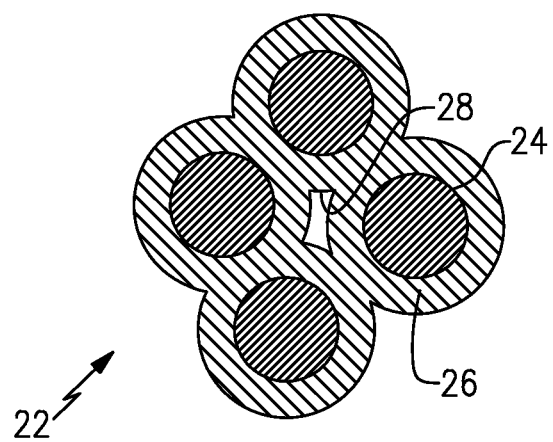
FIG. 2 illustrates a representative portion of a porous composite material that includes a MAX phase material and a high temperature melting point metallic material.

In further examples, the composite material 22 can be porous, as illustrated in FIG. 2 with the pore 28. In one example, the article 20 has a porosity of 30%. The porosity may vary from as low as 0% to as high as 80 volume % in what would be described as a MAXMET foam. The selected porosity can further enhance the vibrational damping characteristics of the composite material 22. For example, increased porosity allows higher local deformation and buckling of the MAX phase particles leading to higher kinking, which is the dominant mechanism of damping in these solids. Without being bound, there is evidence that in MAX phase solids exhibit a kink-based phenomenon as opposed to one that is dependent on the volume of the material. Therefore, porosity increases damping.

In further examples, the composite material 22 has a ratio, in volume percent, of the metallic material 26 to the MAX phase solid 24. In one example, the ratio is from 30:70 to 95:5. In a further example, the ratio is from 30:70 to 70:30. In one example, the ratio of 30:70 to 70:30 may provide a desirable balance between vibration damping and strength, corrosion resistance, creep resistance, fatigue resistance, thermal resistance, and/or oxidation resistance for use in turbomachinery, such as but not limited to gas turbine engines. In further examples, the composite material 22 can have a porosity of 0-80%.

The composite material 22 also provides a method of controlling or tailoring vibrational damping. For example, the method can include identifying a vibration characteristic of the article 20, and then selecting the composition of the composite material 22 with respect to the vibration characteristic. The identification of the vibration characteristic can be conducted by computer analysis, experiment, a combination thereof, or other known technique. In some examples, the vibration characteristic can be a vibrational mode and/or magnitude, and the composition of the MAX phase solid 24 is controlled, or selected, with regard to the volumetric content of the MAX phase solid 24 to tailor the damping characteristics according to the vibration characteristic of the article 20.

The composite material 20 can be fabricated using any of various processing techniques. In one example, a powder of the MAX phase solid 24 can be compacted within a mold and then melt-infiltrated with the metallic material 26. In another example, powders of the MAX phase solid 24 and the metallic material 26 can be mixed and hot pressed to form an article. In other alternatives, powders of the MAX phase solid 24 and the metallic material 26 can be sprayed onto a substrate, hot isostatic pressed, or pressureless-sintered. In pressureless sintering, the metallic material 26 melts and migrates to surround or substantially surround particles of the MAX phase solid 24. However, the article does not substantially shrink during migration of the metallic material 26 and pores form, such as pore 28.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An article comprising:
   a MAX phase solid in the form of particles, the MAX phase solid having a formula $M_{n+1}AX_n$, where n=1-3, M is an early transition metal, A is an A-group element, and X includes at least one of carbon and nitrogen; and
   a high temperature melting point metallic material through which the particles of the MAX phase solid are dispersed such that the particles are spaced apart and the metallic material surrounds the particles, the high temperature melting point metallic material is a metal or an alloy having a base metal selected from the group consisting of Zr, Y, Sc, Be, Co, Fe, Ni, and combinations thereof, and a ratio, in volume percent, of the high temperature melting point metallic material to the MAX phase solid is from 70:30 to 95:5, wherein the high temperature melting point metallic material and the MAX phase solid together define a porosity of 50 vol % to 80 vol %.

2. The article as recited in claim 1, wherein the high temperature melting point metallic material has a hexagonal close-packed (hcp) crystalline structure.

3. The article as recited in claim 1, wherein the high temperature melting point metallic material is Ni or a Ni-based alloy.

4. The article as recited in claim 1, wherein the high temperature melting point metallic material is Co or a Co-based alloy.

5. The article as recited in claim 1, wherein the high temperature melting point metallic material is Fe or an Fe-based alloy.

6. The article as recited in claim 1, wherein the high temperature melting point metallic material is Ti or a Ti-based alloy.

7. The article as recited in claim 1, wherein the MAX phase solid is selected from the group consisting of $Ti_3SiC_2$, $Ti_2AlC$, and combinations thereof.

8. The article as recited in claim 1, wherein the MAX phase solid includes $Ti_2AlC$.

9. The article as recited in claim 1, wherein the MAX phase solid includes $Ti_3SiC_2$.

10. The article as recited in claim 1, wherein the M in the formula $M_{n+1}AX_n$ is selected from the group consisting of Sc, Ti, Zr, Hf, V, Nb, Ta, Cr, Mo, and combinations thereof, and the A in the formula $M_{n+1}AX_n$ is selected from the group consisting of Cd, Al, Gd, In, Tl, Si, Ge, Sn, Pb, P, As, S, and combinations thereof.

11. A method comprising:
    identifying a vibration characteristic of an article;
    controlling a composition of a composite material of the article with respect to the vibration characteristic, the composition including a MAX phase solid in the form of particles having a formula $M_{n+1}AX_n$, where n=1-3, M is an early transition metal, A is an A-group element, and X includes at least one of carbon and nitrogen, and a high temperature melting point metallic material through which the MAX phase solid are dispersed such that the particles are spaced apart and the metallic material surrounds the particles, the high temperature melting point metallic material is a metal or an alloy having a base metal selected from the group consisting of Zr, Y, Sc, Be, Co, Fe, Ni, and combinations thereof, and a ratio, in volume percent, of the high temperature melting point metallic material to the MAX phase solid is from 70:30 to 95:5, wherein the high temperature melting point metallic material and the MAX phase solid together define a porosity of 50 vol % to 80 vol %.

* * * * *